(12) United States Patent
Johnson et al.

(10) Patent No.: US 11,486,803 B2
(45) Date of Patent: *Nov. 1, 2022

(54) PASSIVE AEROSOL DILUTER MECHANISM

(71) Applicant: TSI Incorporated, Shoreview, MN (US)

(72) Inventors: Jason Paul Johnson, Saint Paul, MN (US); Robert C. Anderson, Glenmont, NY (US); Jeremy Jens Kolb, Saint Paul, MN (US); Aaron Serafin Avenido, Minneapolis, MN (US); Robert Plautz, Ramsey, MN (US); Steven Keith Isvik, New Brighton, MN (US)

(73) Assignee: TSI Incorporated, Shoreview, MN (US)

( * ) Notice: Subject to any disclaimer, the term of this patent is extended or adjusted under 35 U.S.C. 154(b) by 194 days.

This patent is subject to a terminal disclaimer.

(21) Appl. No.: 16/912,531

(22) Filed: Jun. 25, 2020

(65) Prior Publication Data
US 2020/0393346 A1 Dec. 17, 2020

Related U.S. Application Data

(63) Continuation of application No. 16/333,347, filed as application No. PCT/US2017/051615 on Sep. 14, 2017, now Pat. No. 10,732,082.
(Continued)

(51) Int. Cl.
*G01N 1/38* (2006.01)
*G01N 15/06* (2006.01)
(Continued)

(52) U.S. Cl.
CPC .............. *G01N 1/38* (2013.01); *G01N 15/06* (2013.01); *G01N 15/065* (2013.01);
(Continued)

(58) Field of Classification Search
CPC ........ G01N 1/38; G01N 15/06; G01N 15/065; G01N 2001/2223; G01N 2001/385;
(Continued)

(56) References Cited

U.S. PATENT DOCUMENTS 5,058,440 A 10/1991 Graze, Jr.
5,922,976 A 7/1999 Russell et al.
(Continued)

FOREIGN PATENT DOCUMENTS

JP H06500851 1/1994
JP 2010515016 5/2010
(Continued)

OTHER PUBLICATIONS

"International Application Serial No. PCT US2017 051615, International Search Report dated Dec. 27, 2017", 3 pgs.
(Continued)

*Primary Examiner* — Randy W Gibson
*Assistant Examiner* — John M Royston
(74) *Attorney, Agent, or Firm* — Schwegman Lundberg & Woessner, P.A.

(57) ABSTRACT

Various embodiments include methods and systems to dilute a sampled particle-laden aerosol stream in a recirculating type of aerosol diluter system. In one embodiment, a system to dilute a sampled aerosol stream includes an aerosol sample inlet. A primary diluter device includes a first inlet to receive the aerosol stream and a second inlet to receive a filtered portion of the aerosol stream and combining the filtered portion with an additional sampled aerosol stream. A flow diverter device splits at least the sampled aerosol stream into a first portion of the sampled aerosol stream and a remaining portion of the sampled aerosol stream. A filter receives the remaining portion of the sampled aerosol stream and provides a filtered aerosol stream to the second inlet of
(Continued)

the primary diluter device. Other methods and apparatuses are disclosed.

25 Claims, 8 Drawing Sheets

Related U.S. Application Data (60) Provisional application No. 62/394,723, filed on Sep. 14, 2016.

(51) Int. Cl.
*G01N 15/00* (2006.01)
*G01N 1/22* (2006.01)

(52) U.S. Cl.
CPC ............... *G01N 2001/2223* (2013.01); *G01N 2001/385* (2013.01); *G01N 2015/0046* (2013.01)

(58) Field of Classification Search
CPC ....... G01N 2015/0046; G01N 15/1012; G01N 15/14; G01N 2001/386
See application file for complete search history.

(56) References Cited

U.S. PATENT DOCUMENTS

| | | | |
|---|---|---|---|
| 6,796,165 | B2 | 9/2004 | Abdul-khalek |
| 9,188,506 | B2 | 11/2015 | Asano et al. |
| 10,732,082 | B2 | 8/2020 | Johnson et al. |
| 2005/0000358 | A1 | 1/2005 | Bryden et al. |
| 2007/0056395 | A1 | 3/2007 | Bae et al. |
| 2007/0092976 | A1 | 4/2007 | Watson et al. |
| 2008/0148812 | A1 | 6/2008 | Wei et al. |
| 2008/0148870 | A1 | 6/2008 | Wei et al. |
| 2008/0202196 | A1 | 8/2008 | Richardson |
| 2009/0044599 | A1 | 2/2009 | Owen |
| 2010/0000609 | A1 | 1/2010 | Goody |
| 2012/0174989 | A1* | 7/2012 | Otsuki ................. G01N 33/005 73/23.31 |
| 2013/0239808 | A1 | 9/2013 | Wu et al. |
| 2013/0317757 | A1 | 11/2013 | Silvis et al. |
| 2014/0093435 | A1 | 4/2014 | Giechaskiel et al. |
| 2016/0139013 | A1 | 5/2016 | Gorbunov |
| 2017/0296727 | A1 | 10/2017 | Burbank et al. |
| 2019/0212235 | A1 | 7/2019 | Johnson et al. |

FOREIGN PATENT DOCUMENTS

| | | |
|---|---|---|
| JP | 2016526671 | 9/2016 |
| SU | 808111 | 3/1981 |
| WO | 2008079813 | 7/2008 |
| WO | 2018053165 | 3/2018 |

OTHER PUBLICATIONS

"International Application Serial No. PCT US2017 051615, Written Opinion dated Dec. 27, 2017", 9 pgs.
"International Application Serial No. PCT US2017 051615, International Preliminary Report on Patentability dated Jan. 10, 2019", 7 pgs.
"U.S. Appl. No. 16/333,347, Preliminary Amendment filed Mar. 14, 2019", 7 pgs.
"Japanese Application Serial No. 2019514300, Voluntary Amendment Filed May 13, 2019", with English claims., 28 pages.
"U.S. Appl. No. 16/333,347, Non Final Office Action dated Jul. 12, 2019", 23 pgs.
"U.S. Appl. No. 16/333,347, Response filed Oct. 10, 2019 to Non-Final Office Action dated Jul. 12, 2019", 13 pgs.
"European Application Serial No. 17851545.8, Response to Communication pursuant to Rules 161(2) and 162 EPC filed Nov. 5, 2019", 11 pgs.
"U.S. Appl. No. 16/333,347, Non Final Office Action dated Nov. 12, 2019", 26 pgs.
"U.S. Appl. No. 16/333,347, Response filed Feb. 12, 2020 to Non Final Office Action dated Nov. 12, 2019", 13 pgs.
"U.S. Appl. No. 16/333,347, Notice of Allowance dated Mar. 24, 2020", 8 pgs.
"European Application Serial No. 17851545.8, Extended European Search Report dated Apr. 21, 2020", 9 pgs.
"U.S. Appl. No. 16/333,347, Corrected Notice of Allowability dated Jul. 9, 2020", 2 pgs.
"Japanese Application Serial No. 2019-514300, Response filed May 7, 2021 to Final Notification of Reasons for Refusal dated Feb. 22, 2021", with English claims, 8 pages.
"Korean Application Serial No. 10-2019-7010599, Notice of Preliminary Rejection dated May 27, 2021", with English translation, 5 pages.
"Korean Application Serial No. 10-2019-7010599, Response filed Jul. 8, 2021 to Notice of Preliminary Rejection dated May 27, 2021", with English claims, 16 pages.
"Japanese Application Serial No. 2019-514300, Notification of Reasons for Refusal dated Oct. 12, 2020", with English translation, 11 pages.
"European Application Serial No. 17851545.8, Response filed Nov. 17, 2020 to Extended European Search Report dated Apr. 21, 2020", 28 pgs.
"Korean Application Serial No. 10-2019-7010599, Notice of Preliminary Rejection dated Nov. 6, 2020", with English translation, 11 pages.
"Japanese Application Serial No. 2019-514300, Response filed Dec. 18, 2020 to Notification of Reasons for Refusal dated Oct. 12, 2020", with English claims, 12 pages.
"Korean Application Serial No. 10-2019-7010599, Response filed Feb. 22, 2021 Notice of Preliminary Rejection dated Nov. 6, 2020", with English claims, 25 pages.
"Japanese Application Serial No. 2019-514300, Final Notification of Reasons for Refusal dated Feb. 22, 2021", with English translation, 10 pages.
U.S. Appl. No. 16/333,347 U.S. Pat. No. 10,732,082, filed Mar. 14, 2019, Passive Aerosol Diluter Mechanism.

* cited by examiner

PASSIVE AEROSOL DILUTER MECHANISM

PRIORITY APPLICATION

This application claims the benefit of priority to U.S. Provisional Application Ser. No. 62/394,723, filed on Sep. 14, 2016, which is incorporated herein by reference in its entirety.

BACKGROUND

In a number of airborne particle-measurement and particle-concentration studies, a condensation particle counter (CPC, also known as a condensation nucleus counter (CNC)) is used to detect particles in a monitored environment. In a CPC, particles can be detected that are too small to scatter enough light to be detected by conventional detection techniques (e.g., light scattering of a laser beam in an optical particle counter, OPC). The small particles are grown to a larger size by condensation formed on the particle. That is, each particle serves as a nucleation point for the working fluid; a vapor, which is produced by the instrument's working fluid, is condensed onto the particles to make the particles larger. After achieving growth of the particle due to condensation of the working fluid vapor onto the particle, CPCs function similarly to optical particle counters in that the individual droplets then pass through the focal point (or line) of a laser beam, producing a flash of light in the form of scattered light. Each light flash is counted as one particle.

However, in certain environments, such as air pollution measurements, engine exhaust research, and regulatory studies involving measurement of size or concentrations of particles in an aerosol stream, the concentration of particles is too high to measure accurately with a CPC. Often, such particle-measurement methods and procedures are defined by a governmental agency, such as the United States Environmental Protection Agency (EPA) or the California Air Resources Board (CARE). Often, a concentration of particles is too high to measure accurately with a CPC. In these environments, particle concentrations can range up to $5 \times 10^9$ particles per cubic centimeter or higher. However, many CPCs can only measure particle concentrations accurately at much lower concentration ranges (e.g., perhaps a factor of $10^4$ lower than the stated particle concentration above) before inaccurate monitoring occurs due to coincidence errors (counting two or more particles in an aerosol sample stream simultaneously). Although various capillary-type and orifice dilators are known in the art, none are capable of accurately providing a known dilution ratio under circumstances of varying temperature and absolute pressure. The problem is often compounded as the actual dilution ratio can vary as a function of time.

DETAILED DESCRIPTION

An aerosol diluter mechanism reduces particle concentrations in high particle-concentration aerosol streams to provide engineers, scientists, and other researchers with a representative sample that meets the recommended operational requirements for CPCs, high-resolution time-of-flight spectrometers, and other particle measurement and sizing instrumentation. The disclosed subject matter is the first to apply flow monitoring, flow averaging, and dilution ratio monitoring together with modular sensors to verify function and working state of a passive dilutor that is used with various ones of the particle measurement and sizing instruments discussed herein.

In various embodiments, and with concurrent reference to the figures contained herein the disclosed subject matter comprises a passive dilutor consisting of, for example, a filter in parallel with a flow-monitoring device or flow-restricting device, such as an orifice, capillary, or valve. The flow-monitoring device or flow-restricting device (e.g., a ruby orifice or other flow-restricting device known in the art) allows for the passage of aerosol particles, potentially with a mixing orifice, mixing cone, or mixing chamber, or not, to follow downstream of the flow-monitoring device or flow-restricting device. Flow (e.g., determined either as a volumetric flowrate or a mass flowrate) through the particle-passing flow-restricting device is monitored by a pressure and a temperature sensor, such that an accurate determination of a flowrate of an aerosol stream through the device can be measured based on combining the measured or predetermined flowrate (the nominal flowrate) with thermodynamic properties of one or more gases comprising the aerosol stream, for a given temperature and pressure, to determine a true or actual flowrate. Combined with a measurement of the total flow through the device, the dilution ratio of the dilutor assembly can be constantly or periodically determined in substantially real-time. Running averages or other such smoothing algorithms may be applied to the dilution ratio data stream that results from the passive diluter mechanism. Used in conjunction with an aerosol detection device, such as a condensation particle counter (CPC), optical particle counter (OPC), spectrometer, or other type of particle monitoring device known in the art (including virtual impactors, cascade impactors, and so on), with or without additional dilution, or a catalytic stripper to remove volatile particles (e.g., from emissions from an exhaust from an engine), the dilution ratio from the passive dilutor can be used to correct the detected particle concentration and measure the true concentration of particles at the inlet of the diluter mechanism. The determination of the true concentration of particles allows, among other things, for the total instrument to measure a higher concentration of aerosol, for instance, from the exhaust of an engine, than the system would be able to measure without dilution.

Figure 1:
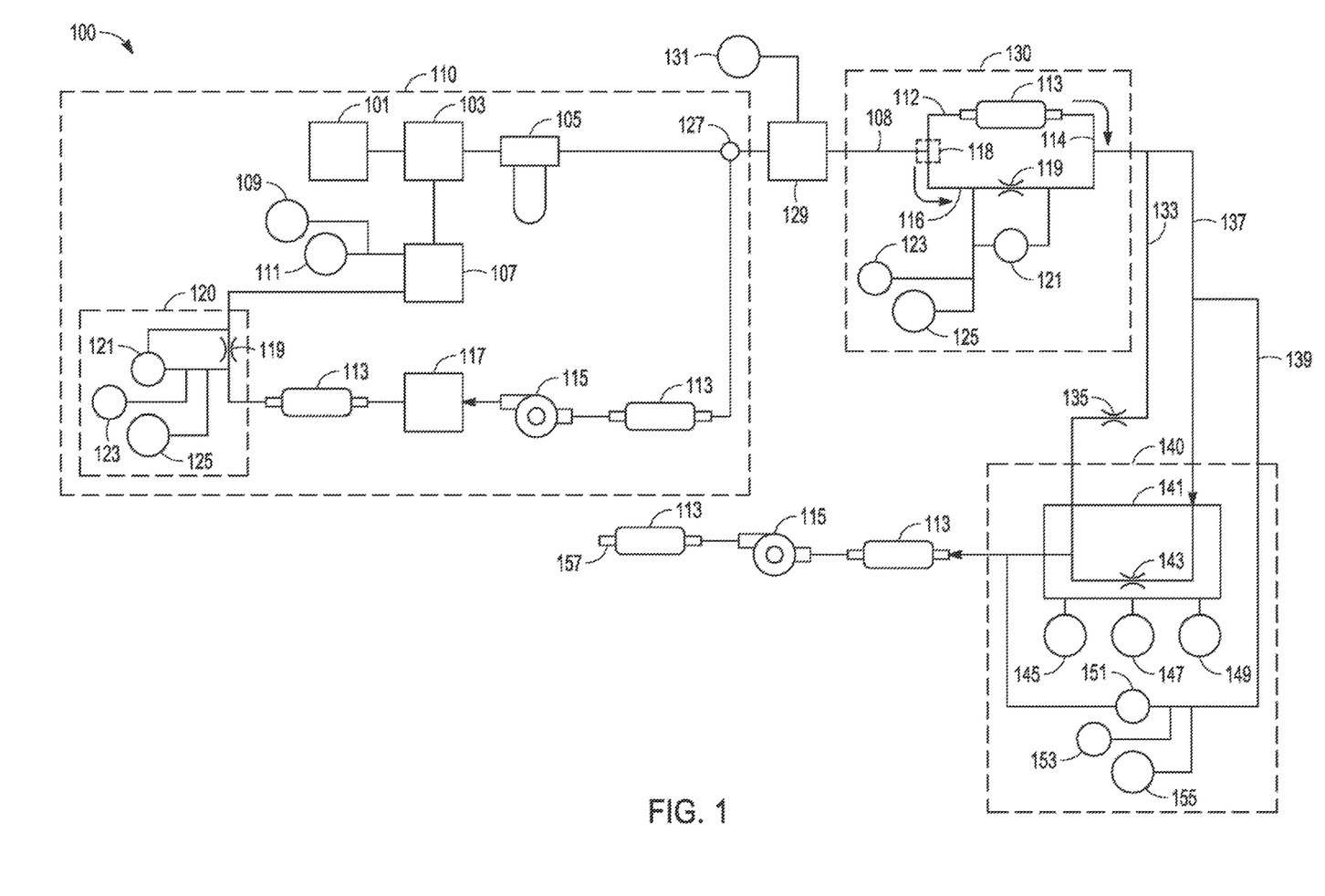
FIG. 1 shows an example diagram of a system implementing an embodiment of a passive aerosol diluter mechanism.

For example, with reference now to FIG. 1, an example diagram of a system 100 implementing an embodiment of a passive aerosol diluter mechanism is shown. The system 100 is shown to include a recirculating primary dilution portion 110, a primary dilution-flow orifice portion 120 for metering airflow, a secondary dilution-flow orifice and mixing portion 130, and a particle measurement portion 140.

The recirculating primary dilution portion 110 includes a sample inlet port 101, which accepts a sampled aerosol stream, a primary diluter device 103, and a cyclone separator 105. A portion of the sampled aerosol stream continues through a tee 127 onto a catalytic stripper 129, while another portion of the aerosol stream continues to another branch of the tee 127, toward a dilution airflow branch. The concentrated aerosol stream divides into two paths. In one path, the majority of the original aerosol stream is cleansed of virtually all particles. In the other path, the remaining small fraction of the aerosol stream retains its original particle concentration. These two paths then re-combine to produce a pre-determined dilution ratio of the aerosol stream.

The dilution airflow branch includes a filter 113 and a pump 115 to draw the dilution airflow from the filter 113 and into a desiccant dryer 117. Another filter 113 is located on the downstream side of the desiccant dryer 117 to remove any particles shed from the desiccant material itself located within the desiccant dryer 117. The dried and filtered airflow then enters the primary dilution-flow orifice portion 120 for metering the airflow. In this example, the primary dilution-flow orifice portion 120 includes a critical orifice 119. The critical orifice 119 is formed from a small hole in a disc (e.g., a ruby disc or plate with a small hole formed therein), placed transverse to the airflow, and is a well-known means of controlling volumetric airflow at a relatively constant rate for a given temperature and pressure. The rate is constant for a given upstream pressure and temperature of gas in the airflow. Upon reading and understanding the disclosure provided herein, the skilled artisan will recognize that another type of flow-monitoring device or flow-restricting orifice, and not necessarily a critical orifice, may be used along with or as an alternative to the critical orifice. However, fore as of understanding of the inventive subject matter, the examples provided include the critical orifice 119. The critical orifice 119 includes a differential-pressure gauge 121, a temperature gauge 123, and an absolute pressure gauge 125. As used herein, each of the temperature and pressure gauges may be electronic temperature and pressure sensors having at least one of an analog output and a digital output.

One example of a critical orifice machined or otherwise formed to have appropriate differential pressure taps, absolute pressure taps, and temperature taps that may be used within the primary dilution-flow orifice portion 120 is disclosed below with regard to FIGS. 2A-2D. Therefore, as discussed in more detail below, the upstream pressure (as measured by the absolute pressure of the absolute pressure gauge 125) and the temperature of the airflow (as measured by the temperature gauge 123) can be used to determine an actual volumetric airflow in the recirculating primary dilution portion 110 of the system 100. Since the actual volumetric flowrate through the critical orifice 119 is a function of upstream pressure and temperature of the airflow, both the temperature and pressure must be monitored. For example, an accurate dilution determination of the passive diluter disclosed herein can change over time due to, for example, filter loading issues. The governing thermodynamic equations to determine the actual volumetric airflow, once the upstream pressure and temperature of the airflow are determined, are known in the art. For example, a hole in the disc of 1.07 mm (approximately 0.042 inches) provides an airflow of approximately 10.7 lpm at standard temperature and pressure, provided there is sufficient pressure upstream of the critical orifice. For this particular embodiment, the dried and filtered portion of the airflow within the recirculating primary dilution portion 110 is about 6.3 lpm. Upon reading and understanding the disclosure provided herein, a skilled artisan would understand how to create other dilution ratios for a particular application, sampled aerosol stream, and required dilution needed for a particular particle monitoring instrument, as described in more detail below. The differential-pressure gauge 121 provides a notification should the critical orifice 119 become clogged or otherwise malfunction.

Once the airflow exits the primary dilution-flow orifice portion 120 of the system 100, the airflow enters a humidity sensor body 107 that includes a temperature gauge 109 and a relative humidity gauge 111 to monitor the temperature and relative humidity (RH) of the airflow passing through the humidity sensor body 107. The airflow downstream of the humidity sensor body 107 then recombines with the sampled aerosol stream in the primary diluter device 103. A mixing cone, not shown but readily understood, within the primary diluter device 103, ensures a uniform distribution in the diluted aerosol stream.

In an alternative embodiment, not shown explicitly but readily understandable to a skilled artisan, rather than branching off at the tee 127 to the drying and filtering portion of the recirculating primary dilution portion 110, the sampled aerosol stream may simply continue directly into the catalytic stripper 129. In this embodiment, a separate airflow (not shown) is provided directly into the filter 113 (upstream of the pump 115). Such a separate airflow can be provided by a clean, dry air (CDA) system that can be injected directly into the primary dilution-flow orifice portion 120. However, an advantage to utilizing the tee 127 to split the sampled aerosol stream within the recirculating primary dilution portion 110 is that all mass flows within the system 100 are balanced (e.g., a sampled aerosol stream sampled at the sample inlet port 101 will be the same as an outlet airflow stream at an exhaust at an output 157 from the particle measurement portion 140).

With regard to various other elements within the recirculating primary dilution portion 110, the cyclone separator 105 helps removes excess water vapor and large particles from the sampled aerosol stream. Suitable versions of the cyclone separator 105 are known in the art and are available from a number of suppliers including Parker Hannifin (6035 Parkland Boulevard Cleveland, Ohio, USA) and TSI, Inc. (500 Cardigan Road, Shoreview, Minn., USA).

The filter 113 may be a High-Efficiency Particulate Air (HEPA) filter, an Ultra-Low Penetration Air (ULPA) filter, or other type of "absolute filter" known independently in the art. Suitable versions of the filter 113 are available a number of suppliers including from Pall Corporation (25 Harbor Park Drive, Port Washington, N.Y., USA). Each of the filters in the system 100 identified as the filter 113, may be identical or similar to one another provided they are absolute filters.

The pump 115 may be any type of gas-transport pump known in the art. Such pumps include positive-displacement pumps such as rotary vane pumps, diaphragm pumps, and peristaltic pumps depending upon a given application.

The desiccant dryer 117 is used to reduce the atmospheric dew point of any gas stream, including the dilution airflow, and is known in the art. The desiccant dryer 117 removes additional water vapor from the airflow that was not trapped by the cyclone separator 105. Suitable versions of the desiccant dryer 117 are available from a number of suppliers including Parker Hannifin (6035 Parkland Boulevard Cleveland, Ohio, USA) and TSI, Inc. (500 Cardigan Road, Shoreview, Minn., USA).

With continuing reference to FIG. 1, downstream of the tee 127, the catalytic stripper 129 includes a temperature gauge 131 to measure a temperature of the now-diluted aerosol stream inside the catalytic stripper 129. The catalytic stripper 129 is typically a heated catalytic element used to remove particle and gas-phase semi-volatile fractions of the sampled aerosol stream. The catalytic stripper 129 can be used when the sampled aerosol stream includes, for example, particles from diesel and internal-combustion generated exhausts. Therefore, depending on the application, the catalytic stripper 129 may not be needed for certain types of particle measurement and concentration studies.

An outlet tube 108 downstream of the catalytic stripper 129 transports the diluted aerosol stream to the secondary dilution-flow orifice and mixing portion 130 of the system 100, and is pneumatically coupled to a tee 118. At the tee 118, the diluted aerosol stream is split where a portion of the diluted aerosol stream is directed into an inlet 116 of another critical orifice 119. The remaining portion of the diluted aerosol stream is directed to the inlet 112 of another filter 113. At an outlet path 114 of the filter 113, a filtered airstream (clean air) recombines with the diluted aerosol stream, creating a more diluted aerosol stream.

The critical orifice 119 of the secondary dilution-flow orifice and mixing portion 130 may be the same as or similar to the critical orifice 119 of the of the primary dilution-flow orifice portion 120, depending on a desired secondary dilution ratio. As will be recognizable to the skilled artisan upon reading and understanding the disclosure provided herein, an increased percentage of the aerosol stream may be diverted to the filter 113 (at either stage of the dilution) and a smaller percentage of the flow of the aerosol stream is diverted to the critical orifice 119 (again, at either stage of the dilution) A pre-determined volumetric flowrate through the critical orifice 119 determines the dilution ration—a smaller volumetric flowrate through the critical orifice 119 means that an increased percentage of the aerosol stream is diverted to the filter 113, creating a higher flowrate of filtered air thereby creating a higher dilution ratio or the aerosol stream after the two streams are recombined.

One example of a critical orifice machined or otherwise formed to have appropriate differential pressure taps, absolute pressure taps, temperature taps, and including an internal mixing chamber that may be used within the secondary dilution-flow orifice and mixing portion 130 is disclosed below with regard to FIG. 3.

Continuing with the example of FIG. 1, an outlet from the secondary dilution-flow orifice and mixing portion 130 is directed into three separate flow paths—a sampled flow path 137 that is directed into a particle monitoring device 141, a bypass flow path 133 that may be used to provide, for example, a sheath flow for operations of the particle monitoring device 141, and an excess flow path 139 that joins aerosol streams from the sampled flow path 137 and the bypass flow path 133 at an outlet (e.g., downstream portion) of the particle monitoring device 141. The excess flow path 139 provides a path for a flowrate of the aerosol stream that exceeds the flowrates need for the sampled flow path 137 and the bypass flow path 133. For example, frequently, the particle monitoring device 141 uses a critical orifice 143 in a sampled flow path internal to the device to regulate internal volumetric flowrates. In a specific exemplary embodiment the volumetric flowrate of the internal sample flow path is 0.1 lpm for a CPC or CNC. The bypass volumetric flowrate may be about 0.6 lpm, and a volumetric flowrate in the excess flow path 139 will be approximately equal to a total volumetric flowrate of the sampled aerosol stream at sample inlet port 101, minus the combined volumetric flowrate within the sampled flow path 137 and the bypass flow path 133 (in this example, the combined volumetric flowrates are about 0.7 lpm).

In this embodiment, the bypass flow path 133 is coupled to a throttling device 135 upstream of the particle monitoring device 141. Since the aerosol stream through the bypass flow path 133 does not need to be closely monitored for an actual volumetric flowrate, the throttling device 135 may be, for example, a throttling valve (e.g., a ball valve gate valve, butterfly valve, or other control valve), a capillary flow-restricting device, or a critical or non-critical orifice.

In some embodiments of the system 100, the combined aerosol streams from the sampled flow path 137, the sampled flow path 137, and the excess flow path 139, at the outlet of the particle monitoring device 141, are then filtered by means of a filter 113, a pump 115, and another filter 113, downstream of the pump 115. Each of the filters 113 and the pump 115 may the same as or similar to the other filters and pumps described herein.

In other examples, the filter 113 upstream of the pump 115, the pump 115, and the filter 113 downstream of the pump 115 may not be needed if the combined aerosol streams can safely be exhausted to the environment (or into separate filtration system such as a house exhaust or scrubber (not shown)). In other examples, the pump 115 may be used, with or without filters, to draw the sampled aerosol stream through the particle monitoring device 141.

The particle monitoring device 141 may be any of a variety of particle measurement devices to measure particle concentrations, particle sizes, particle masses, particle size ranges, and so on depending on the type of particle study under consideration. For example, the particle monitoring device 141 may be a CPC, a CNC, an OPC, a particle spectrometer or other type of particle measurement device known in the art. The particle monitoring device 141 may also include a differential pressure gauge 151, a temperature gauge 153, and an absolute pressure gauge 155. If the particle monitoring device 141 is a CPC or a CNC, the particle monitoring device 141 may also include an optics temperature gauge 145, a condenser temperature gauge 147, and a saturator temperature gauge 149. In various embodiments, the particle monitoring device 141 may include more than one type of measurement device, configured in tandem.

Each of the measured temperatures, pressures, differential pressures, and, in the case of a CPC or CNC, the optics temperature, the condenser temperature, and the saturator temperature, are input into a computing device (e.g., a laptop computer, a tablet device, or directly into, for example, a processor located within the particle monitoring device 141. These variables are then used to determine in substantially real time an actual volumetric flowrate in different portions of the system 100. The actual volumetric flowrate is then used to determine an actual dilution ratio of the sampled aerosol stream as discussed in more detail below with regard to the governing algorithms.

In various embodiments, the system 100 of FIG. 1 may be incorporated, in whole or in part, into a particle monitoring device (e.g., a CPC, an OPC, or a spectrometer), or portions of the system 100 may be a standalone passive particle diluter. For example, the secondary dilution-flow orifice and mixing portion 130 may be used or incorporated within an existing particle monitoring device. Also, the number of dilution stages (e.g., the primary dilution-flow orifice portion 120 and the secondary dilution-flow orifice and mixing portion 130) may be reduced to a single stage. In other examples, the number of dilution stages may be increased to increase an overall dilution ratio of a sample aerosol stream (e.g., several diluters may be pneumatically coupled in series). Further, the skilled artisan will recognize that different flow rates may be chosen to change dilution ratios to dilute a sampled aerosol stream to account for a given particle monitoring device, detection efficiencies, response times, and other parameters of the particle monitoring device. Such combinations are within the scope of the inventive subject matter disclosed herein.

Governing Algorithms

As indicated above, the algorithms below are one example of how the measured temperatures, pressures, and differential pressures are used to determine, in substantially real time, an actual volumetric flowrate in different portions of the system 100 based on thermodynamic properties of gases in the aerosol stream and filtered airstream. The actual volumetric flowrate is then used to determine an actual dilution ratio of the sampled aerosol stream.

With reference to the firmware and software components of the aerosol diluter mechanism, discussed in more detail below, the algorithms below include relevant portions that, in one embodiment, define how the dilution flow and dilution ratio of the secondary dilutor are used in the disclosed inventive subject matter. Certain portions of the code include explanations for the related portion. For example, the averaging portion of the code describes how the averaging function operates. For this example of the averaging, the first function takes raw numbers from the temperature and pressure gauges and converts them into actual measurements. The data stream is recorded and feeds forward an averaged version, an average being based, in this example, on the last five seconds worth of data. However, a person of ordinary skill in the art, based on reading and understanding the inventive subject matter disclosed herein, will understand each portion of the code and, accordingly, will understand how to modify the code for various operating and monitoring environments.

This function reads an analog to digital converter associated with various ones of the temperature and pressure measurement devices and convert measured units into appropriate units of kiloPascals and Celsius.

```
void PNEA::ConvertToUnits( )
{
    // Convert all the ADC readings to actuall measurement values
    // ADC Main0 - No input on channels 5 and 7
    m_PCBTemperature       = CalculateTemperature_LM35D(m_ADC_Main0_readings[0]);
    m_CondenserTemperature = CalculateThermistor_T(m_ADC_Main0_Voltages[1]);
    m_SaturatorTemperature = CalculateThermistor_T(m_ADC_Main0_Voltages[2]);
    m_MainTestVoltage5VA = m_ADC_Main0_Voltages[4] * 2.5f;
    m_OpticsHeaterVoltage = m_ADC_Main0_Voltages[6] * 2.6f;
    // ADC Main1 - No input on channel 7
    m_SheathPumpVoltage   = m_ADC_Main1_Voltages[0] * 1.2f;
    m_DilutionPumpVoltage = m_ADC_Main1_Voltages[1] * 4.0f;
    m_CPCPumpVoltage      = m_ADC_Main1_Voltages[2] * 1.357f;
    m_MainTestVoltage24V = m_ADC_Main1_Voltages[3] * 12.0f;
    m_MainTestVoltage12V = m_ADC_Main1_Voltages[4] * 5.99f;
    m_MainTestVoltage3_3V = m_ADC_Main1_Voltages[5] * 1.649f;
    m_MainTestVoltage6V   = m_ADC_Main1_Voltages[6] * 4.0f;
    m_OpticsTemperature   = CalculateThermistor_T(m_ADC_Main0_Voltages[3]);
    m_CPCDiffPressure     =
CalculateDeltaPressure_MPXV5004(m_ADC_SNSR1_Voltages[7]);
    m_CPCAbsPressure      =
CalculateAbsolutePressure_MPXAZ6130(m_ADC_SNSR2_Voltages[7]);
    m_CPCFlowTemperature = m_OpticsTemperature;
    m_BypassAbsPressure = m_CPCAbsPressure;
    m_BypassDiffPressure = m_CPCDiffPressure;
    m_BypassTemperature = m_CPCFlowTemperature;
    m_DilutionAbsPressure =
CalculateAbsolutePressure_MPXAZ6130(m_ADC_SNSR2_Voltages[4]);
    m_DilutionDiffPressure =
CalculateDeltaPressure_MPXV5010(m_ADC_SNSR2_Voltages[1]);
    m_DilutionTemperature = CalculateThermistor_T(m_ADC_SNSR2_Voltages[0]);
    m_DilutionAbsPressure2 =
CalculateAbsolutePressure_MMAZ6130(m_ADC_SNSR0_Voltages[1]);
    m_DilutionDiffPressure2 =
CalculateDeltaPressure_HSCDRRN002NDAA(m_ADC_SNSR0_voltages[0]);
    m_DilutionTemperature2 = CalculateThermistor_T(m_ADC_SNSR0_Voltages[2]);
    m_DryerHumidity = CalculateHumidity_HIH4031(m_ADC_SNSR1_Voltages[0],
m_DryerTemperature_Avg_Average( ));
    m_DryerTemperature    = CalculateTherrmistor_T(m_ADC_SNSR1_Voltages[2]);
    m_AmbientPressure     =
CalculateAbsolutePressure_MPXAZ6130(m_ADC_SNSR1_Voltages[1]);
    m_HeatedInletTemperature = CalculateThermistor_T(m_ADC_SNSR1_Voltages[6]);
}
```

This function averages the readings.

```
void PNEA::AverageAll( )
{
    m_LaserCurrent_Avg.Add(m_LaserCurrent);
    m_BackgroundVoltage_Avg.Add(m_BackgroundVoltage);
    m_PCBTemperature_Avg.Add(m_PCBTemperature);
    m_CondenserTemperature_Avg.Add(m_CondenserTemperature);
    m_SaturatorTemperature_Avg.Add(m_SaturatorTemperature);
```

-continued

```
    m_OpticsHeaterVoltage_Avg.Add(m_OpticsHeaterVoltage);
    m_MainTestVoltage5VA_Avg.Add(m_MainTestVoltage5VA);
    m_SheathPumpVoltage_Avg.Add(m_SheathPumpVoltage);
    m_DilutionPumpVoltage_Avg.Add(m_DilutionPumpVoltage);
    m_CPCPumpVoltage_Avg.Add(m_CPCPumpVoltage);
    m_MainTestVoltage24V_Avg.Add(m_MainTestVoltage24V);
    m_MainTestVoltage12V_Avg.Add(m_MainTestVoltage12V);
    m_MainTestVoltage3_3V_Avg.Add(m_MainTestVoltage3_3V);
    m_MainTestVoltage6V_Avg.Add(m_MainTestVoltage6V);
    m_CPCDiffPressure_Avg.Add(m_CPCDiffPressure);
    m_HeatedInletTemperature_Avg.Add(m_HeatedInletTemperature);
    m_OpticsTemperature_Avg.Add(m_OpticsTemperature);
    m_CPCAbsPressure_Avg.Add(m_CPCAbsPressure);
    m_CPCFlowTemperature_Avg.Add(m_CPCFlowTemperature);
    m_DilutionAbsPressure_Avg.Add(m_DilutionAbsPressure);
    m_DilutionTemperature_Avg.Add(m_DilutionTemperature);
    m_DilutionDiffPressure_Avg.Add(m_DilutionDiffPressure);
    m_DilutionAbsPressure2_Avg.Add(m_DilutionAbsPressure2);
    m_DilutionTemperature2_Avg.Add(m_DilutionTemperature2);
    m_DilutionDiffPressure2_Avg.Add(m_DilutionDiffPressure2);
    m_BypassAbsPressure_Avg.Add(m_BypassAbsPressure);
    m_BypassTemperature_Avg.Add(m_BypassTemperature);
    m_BypassDiffPressure_Avg.Add(m_BypassDiffPressure);
    m_DryerTemperature_Avg.Add(m_DryerTemperature);
    m_AmbientPressure_Avg.Add(m_AmbientPressure);
    m_DryerHumidity_Avg.Add(m_DryerHumidity);
}
```

This function calculates the secondary dilution ratio.

```
float32 PNEA::CalculateDilutionRatio2( )
{
    float32 DilutionRatio, Temp1, DilutionFlow, BypassFlow;
    float32 DilutionTempAvg, CPCTempAvg, BypassTempAvg;
    float32 DilutionAbsPressureAvg, CPCAbsPressureAvg, BypassAbsPressureAvg;
    float32 DilutionDiffPressureAvg;
    DilutionTempAvg = m_DilutionTemperature2_Avg.Average( ) + 273.15f;
    DilutionAbsPressureAvg = m_DilutionAbsPressure2_Avg.Average( );
    DilutionDiffPressureAvg = m_DilutionDiffPressure2_Avg.Average( );
    CPCTempAvg = m_CPCFlowTemperature_Avg.Average( ) + 273.15f;
    CPCAbsPressureAvg = m_CPCAbsPressure_Avg.Average( );
    BypassTempAvg = m_BypassTemperature_Avg.Average( ) + 273.15f;
    BypassAbsPressureAvg = m_BypassAbsPressure_Avg.Average( );
    if (m_bDilutionRatioEn){
        DilutionFlow = m_DilutionFlow2.m_StandardFlowRateAvg.Average( );
        //Assuming Bypass and CPC Flow are at same Temperature and Pressure
        BypassFlow = m_BypassFlow.m_StandardFlowRateAvg.Average( );
        Temp1 = m_CPCFlow.m_StandardFlowRateAvg.Average( ) + BypassFlow;
        if (DilutionFlow == 0)
            DilutionRatio = 0.0f;
        else
        {
            DilutionRatio = Temp1 / DilutionFlow;
        }
    }
    else
        DilutionRatio = 1.0;
    return DilutionRatio;
}
```

A skilled artisan will recognize that other algorithms based on principles of thermodynamics, may be used with the system 100 of FIG. 1. The algorithms above are provided to illustrate more fully how the various temperature, pressure, differential pressures, and so on are used to determine actual dilution ratios. For example, the skilled artisan will recognize how to apply the appropriate algorithms if more dilution stages are added.

Figure 2A:
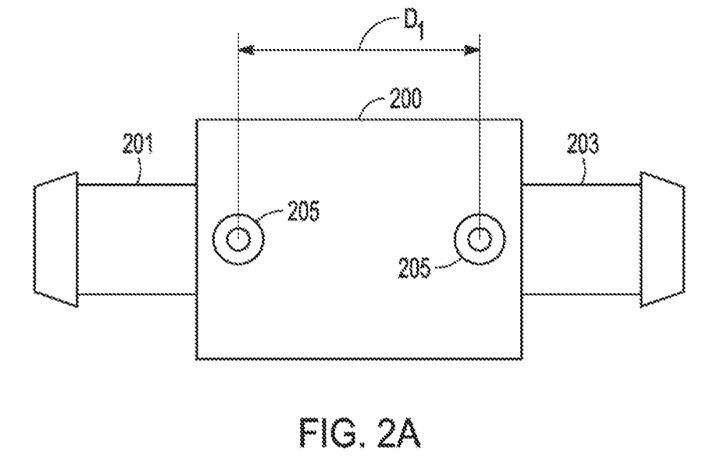
FIGS. 2A-2D show an embodiment of a dilution-flow orifice fitting for metering airflow.
Figure 2B:
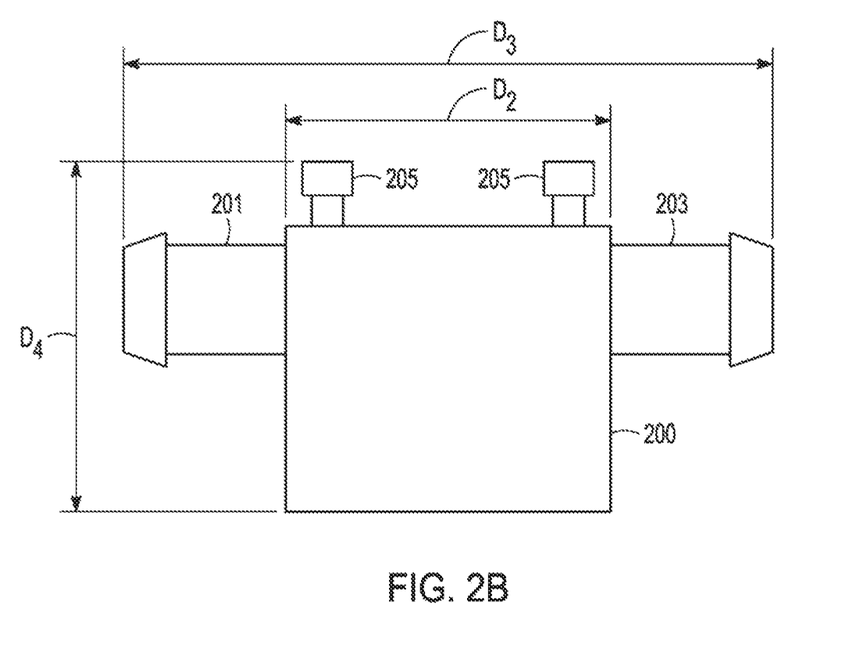
Figure 2C:
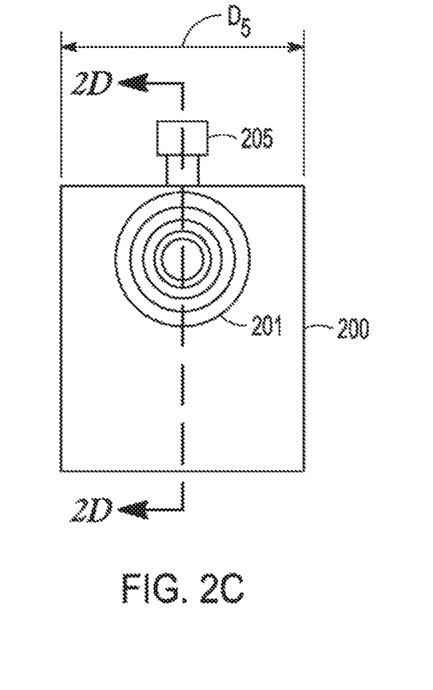
Figure 2D:
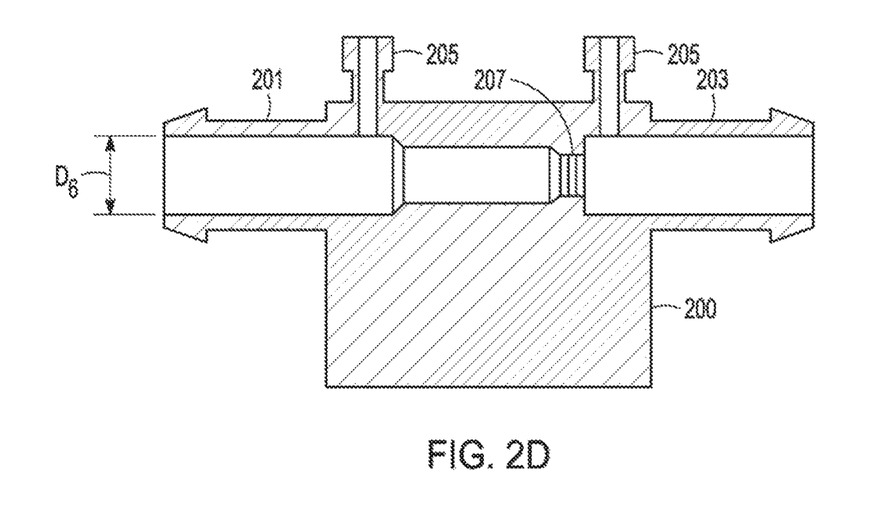

Referring now to FIGS. 2A-2D, an embodiment of a dilution-flow orifice fitting 200 for metering airflow is shown. For example, FIG. 2A is a top view of the dilution-flow orifice fitting 200 and is shown to include an aerosol stream inlet port 201, an aerosol stream outlet port 203, and a pair of differential pressure ports 205 all machined or otherwise formed as part of the dilution-flow orifice fitting 200. The pair of differential pressure ports 205 is mounted on either side (upstream and downstream sides) of an internal critical orifice, discussed below with reference to FIG. 2D. As noted above, the dilution-flow orifice fitting 200 is used to meter either a filtered (clean) airflow or a particle-laden airflow (e.g., aerosol stream). In a specific exemplary embodiment, a dimension $D_1$ from the centerlines of the differential pressure ports 205 is about 11.4 mm (approximately 0.450 inches). The dilution-flow orifice fitting 200 may be machined or otherwise formed from a variety of materials, as discussed in more detail below.

FIG. 2B shows a front (elevation) view of the dilution-flow orifice fitting 200. In a specific exemplary embodiment, a dimension $D_2$, indicating a length of a main portion of the dilution-flow orifice fitting 200, is about 15.2 mm (approximately 0.600 inches), a dimension $D_3$, indicating an overall length of the dilution-flow orifice fitting 200, is about 30.5 mm (approximately 1.20 inches), and a dimension $D_4$, indicating an overall height of the dilution-flow orifice fitting 200, is about 16.5 mm (approximately 0.650 inches).

FIG. 2C shows a side (elevation) view, looking from the aerosol stream inlet port 201. FIG. 2C also indicates a cross-section, labeled 2D-2D, that is discussed with reference to FIG. 2D, below. In a specific exemplary embodiment, a dimension $D_5$, indicating an overall width of the dilution-flow orifice fitting 200, is about 11.4 mm (approximately 0.450 inches).

FIG. 2D shows a front (elevation) cross-sectional view. The dilution-flow orifice fitting 200 is shown to include a critical orifice 207. The critical orifice 207 may the same as or similar to the critical orifice 119 discussed above with reference to FIG. 1. Notice that the critical orifice 207 is located, from a fluid mechanics perspective, between the differential pressure ports 205 to allow monitoring of the differential pressure across the critical orifice 207. In a specific exemplary embodiment, a dimension $D_6$, indicating a diameter of the aerosol stream inlet port 301, is about 3.81 mm (approximately 0.150 inches).

With regard to FIGS. 2A-2D overall, in a specific exemplary embodiment, the dilution-flow orifice fitting 200 is machined or otherwise formed from stainless steel (e.g., 316L stainless). However, the skilled artisan will recognize that other suitable materials may be used as well, provided that electrostatic attraction does not remove a significant percentage of particles from the airflow. For example, friction induced by airflow through a plastic version of the dilution-flow orifice fitting 200 can induce a static charge on plastic (unless coated with, for example, a electrically-conductive material). A significant number of particles in the airflow, especially those particles less than a few microns in diameter, will be removed by electrostatic attraction of the particles to the plastic body of the dilution-flow orifice fitting 200. Therefore, materials from which the dilution-flow orifice fitting 200 is formed need to be considered. The skilled artisan will further recognize that each of the dimensions provided above are merely examples and are given only to illuminate more fully various exemplary embodiments that may be used to produce the dilution-flow orifice fitting 200. For example, the various dimensions shown may be increased to allow for much higher volumetric flowrates. Alternatively, the various dimensions shown may be decreased to allow for much lower volumetric flowrates, while concurrently maintaining a small form factor to fit within, for example, a particle monitoring device (e.g., such as the particle monitoring device 141 of FIG. 1).

Figure 3A:
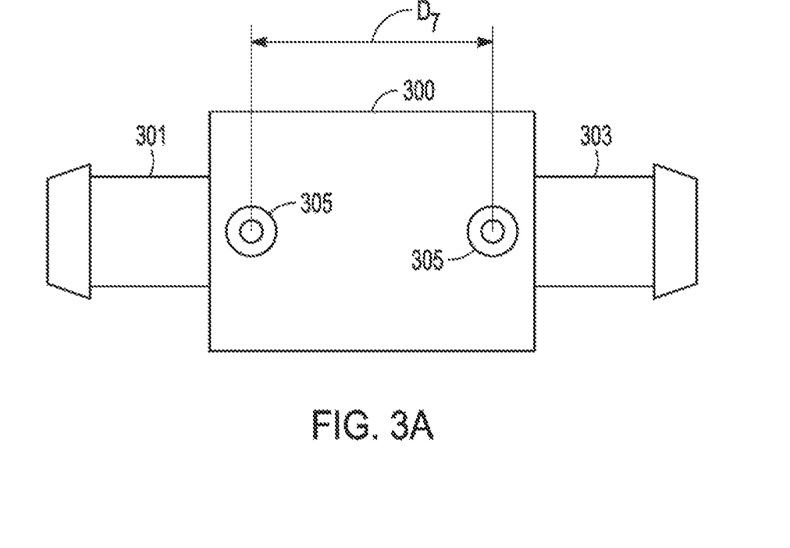
FIGS. 3A-3D shows an embodiment of a dilution-flow orifice and mixing-tee to dilute a sample particle-laden airflow with clean air (e.g., a substantially particle-free airflow)

Referring now to FIGS. 3A-3D, an embodiment of a dilution-flow orifice and mixing-tee 300 to dilute a sample particle-laden airflow with clean air (e.g., a substantially particle-free airflow) is shown. For example, FIG. 3A is a top view of the dilution-flow orifice and mixing-tee 300 and is shown to include an aerosol stream inlet port 301, a clean air inlet port 303, and a pair of differential pressure ports 305 all machined or otherwise formed as part of the dilution-flow orifice and mixing-tee 300. The pair of differential pressure ports 305 is mounted on either side (upstream and downstream sides) of an internal critical orifice, discussed below with reference to FIG. 3D. As noted above, the dilution-flow orifice and mixing-tee 300 is used to both meter either a clean airflow or a particle-laden airflow (e.g., aerosol) and mix the aerosol stream and filtered airstream together, thereby producing a diluted aerosol stream at the clean air inlet port 303. In a specific exemplary embodiment, a dimension $D_7$ from the centerlines of the differential pressure ports 305 is about 11.4 mm (approximately 0.450 inches). The dilution-flow orifice and mixing-tee 300 may be machined or otherwise formed from a variety of materials, as discussed in more detail below.

Figure 3B:
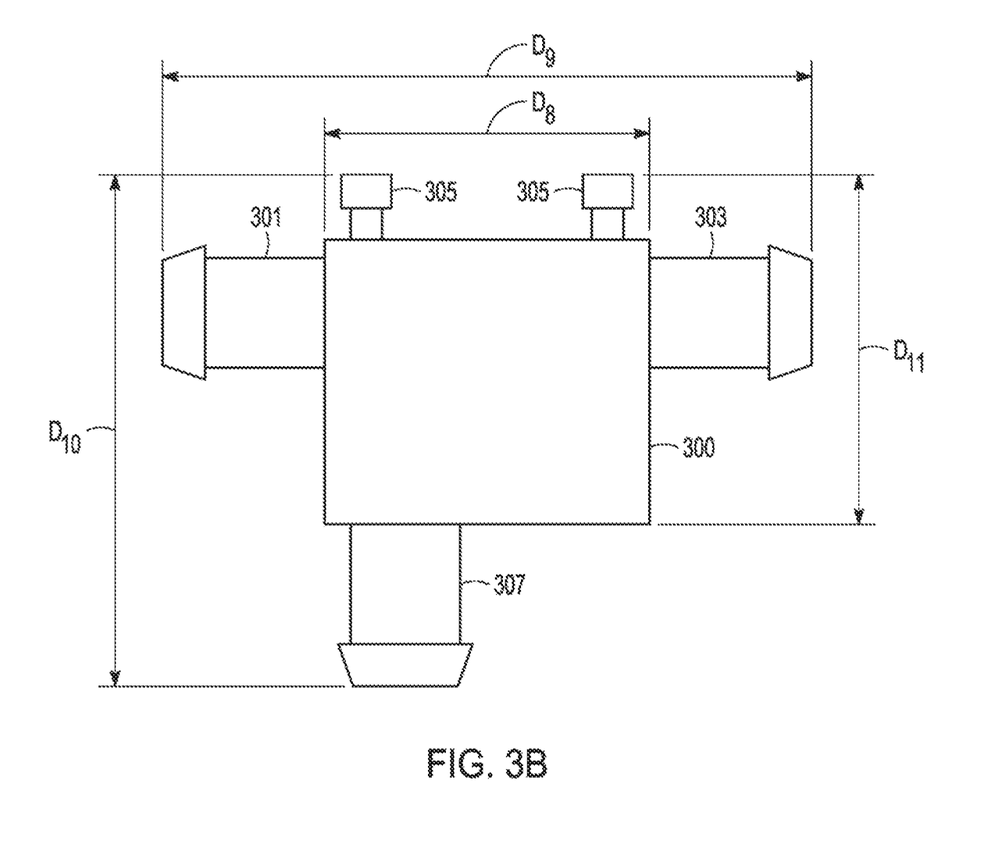

FIG. 3B shows a front (elevation) view of the dilution-flow orifice and mixing-tee 300. In a specific exemplary embodiment, a dimension $D_8$, indicating a length of a main portion of the dilution-flow orifice and mixing-tee 300, is about 15.2 mm (approximately 0.600 inches), a dimension $D_9$, indicating an overall length of the dilution-flow orifice and mixing-tee 300, is about 30.5 mm (approximately 1.20 inches), a dimension $D_{10}$, indicating an overall height of the dilution-flow orifice and mixing-tee 300, is about 24.1 mm (approximately 0.950 inches), and a dimension $D_{11}$, indicating a height of the main portion of the body of the dilution-flow orifice and mixing-tee 300 to an uppermost portion of the pair of differential pressure ports, is about 16.5 mm (approximately 0.650 inches).

Figure 3C:
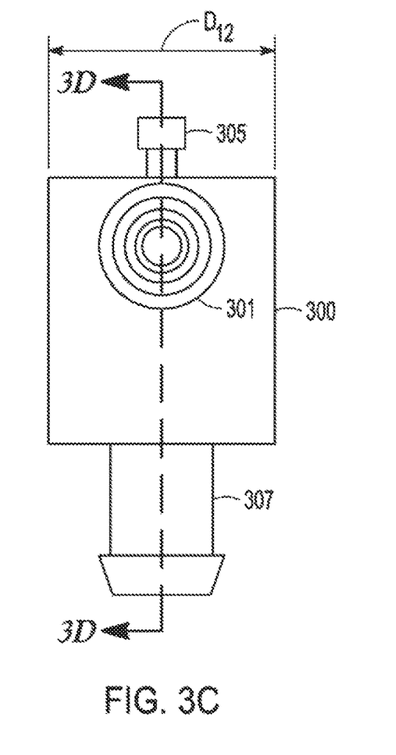

FIG. 3C shows a side (elevation) view, looking from the aerosol stream inlet port 301. FIG. 3C also indicates a cross-section, labeled 3D-3D, that is discussed with reference to FIG. 3D, below. In a specific exemplary embodiment, a dimension $D_{12}$, indicating an overall width of the dilution-flow orifice and mixing-tee 300, is about 11.4 mm (approximately 0.450 inches).

Figure 3D:
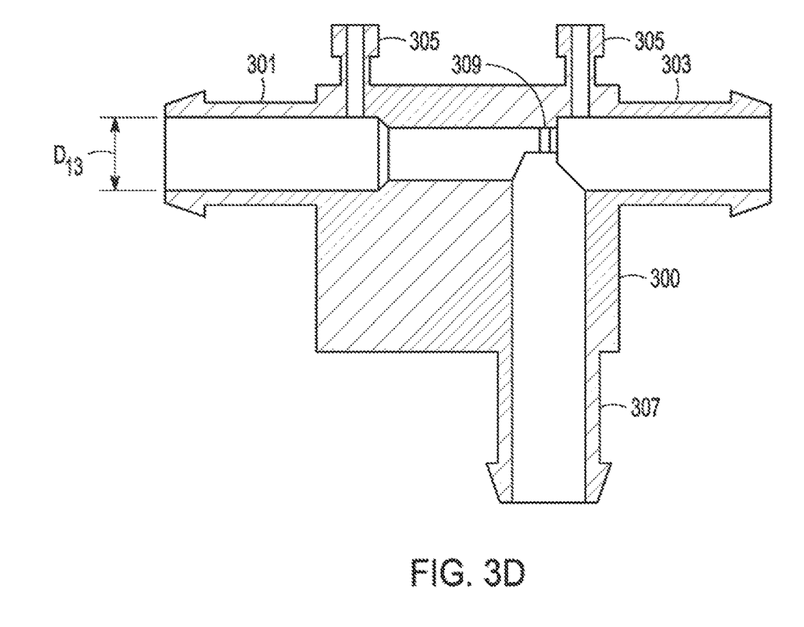

FIG. 3D shows a front (elevation) cross-sectional view. The dilution-flow orifice and mixing-tee 300 is shown to include a critical orifice 309. The critical orifice 309 may the same as or similar to the critical orifice 119 discussed above with reference to FIG. 1. Notice that the critical orifice 309 is located, from a fluid mechanics perspective, between the differential pressure ports 305 to allow monitoring of the differential pressure across the critical orifice 309. In a specific exemplary embodiment, a dimension $D_{13}$, indicating a diameter of the aerosol stream inlet port 301, is about 3.81 mm (approximately 0.150 inches).

With regard to FIGS. 3A-3D overall, in a specific exemplary embodiment the dilution-flow orifice and mixing-tee 300 is machined or otherwise formed from stainless steel (e.g., 316L stainless). For example, the dilution-flow orifice and mixing-tee 300 may be formed from the same or a similar material used to form the dilution-flow orifice fitting 200 of FIGS. 2A-2D. However, the skilled artisan will recognize that other suitable materials may be used as well, provided that electrostatic attraction does not remove a significant percentage of particles from the airflow. For example, as noted above with reference to the dilution-flow orifice fitting 200, friction induced by airflow through a plastic version of the dilution-flow orifice and mixing-tee 300 can induce a static charge on plastic. A significant number of particles in the airflow, especially those particles less than a few microns in diameter, will be removed by electrostatic attraction of the particles to the plastic body of the dilution-flow orifice and mixing-tee 300. Therefore, materials from which the dilution-flow orifice and mixing-tee 300 is formed need to be considered. The skilled artisan will further recognize, as with the dilution-flow orifice fitting 200 discussed above, that each of the dimensions provided above are merely examples and are given only to illuminate more fully various exemplary embodiments that may be used to produce the dilution-flow orifice and mixing-tee 300.

Upon reading and understanding the disclosure provided herein, the skilled artisan will further recognize that the inventive subject matter can be practiced without the actual fittings of FIGS. 2A-2D and FIGS. 3A-3D. The fittings in these figures represent one way in which to implement embodiments of the disclosed subject matter. However, the inventive subject matter of FIG. 1 can be practiced with "discrete components" as indicated in FIG. 1. That is, critical orifices, temperature and pressure gauges, and filters can be used as indicated in FIG. 1 to practice embodiments of the invention.

Figure 4A:
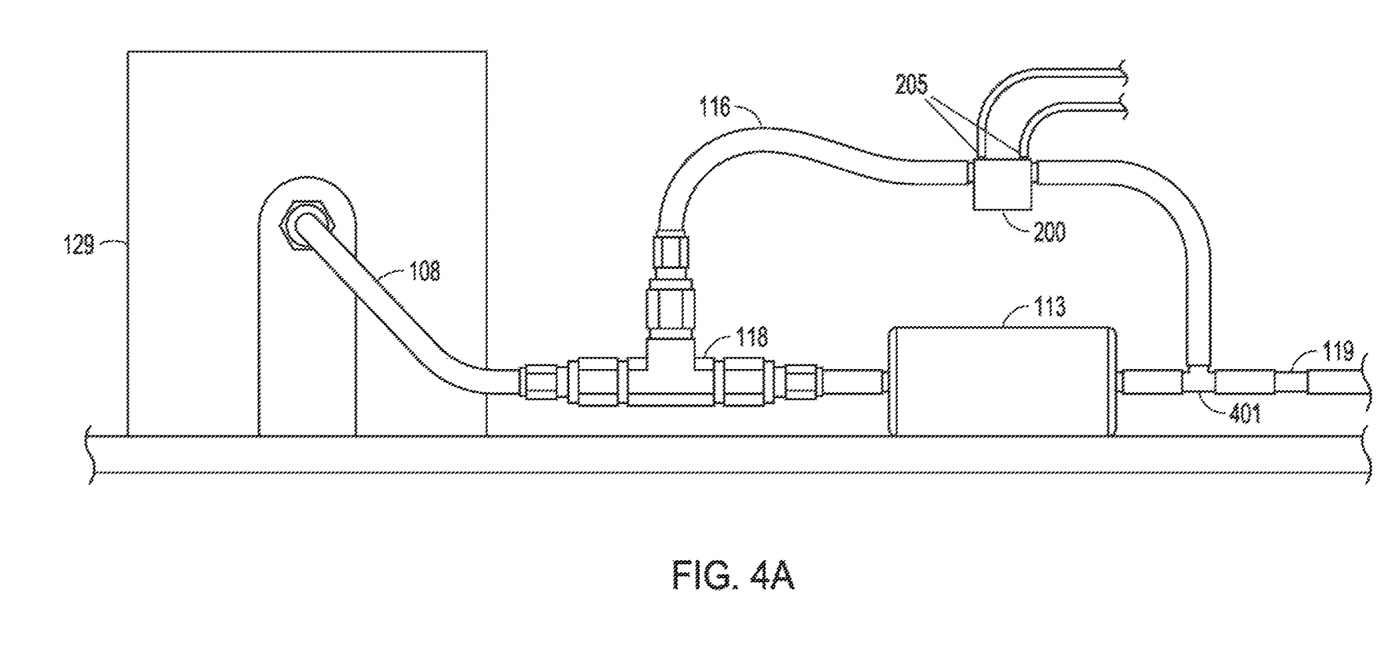
FIG. 4A shows an embodiment of a secondary diluter-assembly incorporating the dilution-flow orifice fitting of FIGS. 2A-2D.

For example, FIG. 4A shows an embodiment of a secondary diluter-assembly incorporating the dilution-flow orifice fitting of FIGS. 2A-2D. However, rather than using the dilution-flow orifice and mixing-tee 300 of FIGS. 3A-3D, discrete components are used to constitute a mixing portion (combining aerosol streams with a filtered airstream) to produce a diluted aerosol stream.

With concurrent reference to FIG. 1, FIG. 4A is shown to include the catalytic stripper 129, an outlet tube 108 from the catalytic stripper 129, the tee 118, the inlet 116 to the dilution-flow orifice fitting 200, the differential pressure ports 205 from the dilution-flow orifice fitting 200, the filter 113, a secondary tee 401 downstream of the filter 113, and the critical orifice 119. To avoid obscuring the embodiment of FIG. 4A, the temperature and pressure gauges within the secondary dilution-flow orifice and mixing portion 130 of FIG. 1 are not shown in FIG. 4A. In the embodiment of FIG. 4A, the critical orifice 119 of FIG. 1 is contained within the dilution-flow orifice fitting 200 of FIG. 4A. The "mixing function" (of the aerosol stream and a filtered airstream) of the dilution-flow orifice and mixing-tee 300 of FIGS. 3A-3D is not used in FIG. 4A. Instead the mixing function is performed by a combination of the tee 118, the filter 113 and the dilution-flow orifice fitting 200, coupled with the aerosol stream, downstream from the dilution-flow orifice fitting 200, and the filtered airstream, downstream of the filter 113, being rejoined and combined (e.g., mixed) in the secondary tee 401, as will be recognizable in view of the secondary dilution-flow orifice and mixing portion 130 of FIG. 1. (The critical orifice 119 of FIG. 4A, downstream of the filter 113, is optional and may be used for a low-flow pressure monitoring device and is not shown in FIG. 1.)

Figure 4B:
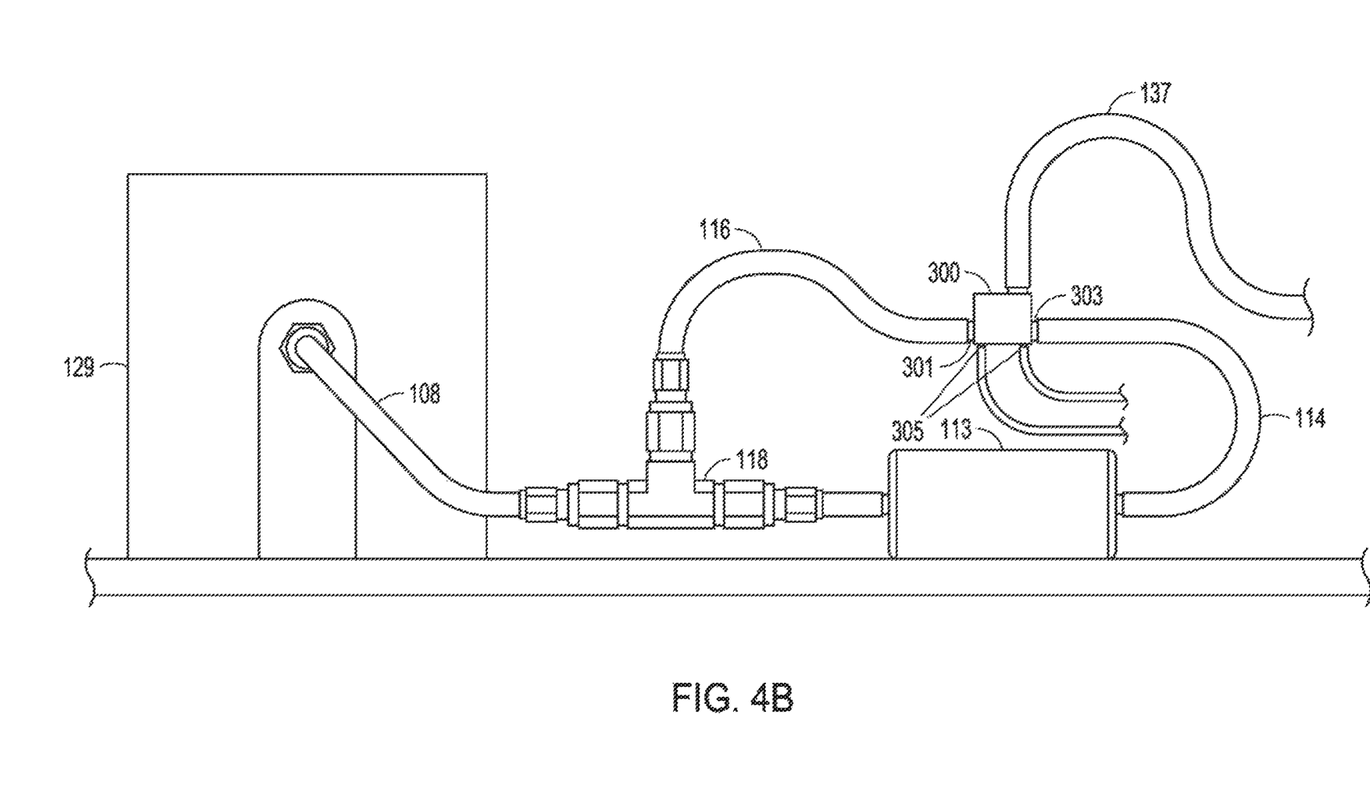
FIG. 4B shows an embodiment of a secondary diluter-assembly incorporating the dilution-flow orifice and mixing-tee of FIGS. 3A-3D.

FIG. 4B shows an embodiment of a secondary diluter-assembly incorporating the dilution-flow orifice and mixing-tee of FIGS. 3A-3D. Again, with concurrent reference to FIG. 1, FIG. 4B is shown to include the catalytic stripper 129, an outlet tube 108 from the catalytic stripper 129, the tee 118, the inlet 116 to the aerosol stream inlet port 301 of the dilution-flow orifice and mixing-tee 300 the differential pressure ports 305 from the dilution-flow orifice and mixing-tee 300, the filter 113, the outlet path 114 from the filter 113 to the clean air inlet port 303 of the dilution-flow orifice and mixing-tee 300 and the sampled flow path 137 that continues to the particle monitoring device 141 (not shown in FIG. 4B). To avoid obscuring the embodiment of FIG. 4B, the temperature and pressure gauges within the secondary dilution-flow orifice and mixing portion 130 of FIG. 1 are not shown in FIG. 4B.

Based on reading and understanding the disclosure of the inventive subject matter provided herein, the skilled artisan can readily envision other ways to incorporate various combinations of the dilution-flow orifice fitting 200 and the dilution-flow orifice and mixing-tee 300, along with various discrete components, that are all within a scope of the present disclosure. The skilled artisan will also recognize that fewer or more dilution stages may be used as needed for a particular application.

Therefore, included in the disclosed subject matter are a system diagram describing various embodiments of the passive aerosol diluter mechanism. Firmware or software, as discussed above with regard to the various algorithms, are used to correct particle concentrations for one or more actual dilution ratios, and may also be included as a portion of the overall system. The firmware or software may be incorporated into the particle monitoring device 141 (e.g., a CPC, CNC, OPC, or spectrometer) used to monitor the diluted particle stream, as a separate part of the system, or as a separate standalone component that may be run on various types of computers, laptops, tablets, or other computing devices for either concurrent or later analysis of the recorded measurements. The fittings that allow for pressure, temperature, and flow measurements to be made in the passive aerosol diluter mechanism may also be included. In various embodiments, measurements of differential pressure, absolute pressure, and temperature across various ones of the filters, flow-restriction devices, throttling valves, critical orifices, and so on can be monitored at predetermined intervals (e.g., minute-by-minute every five seconds, every second, every one-tenth of a second, etc.). Also, various dilution ratios (e.g., $10^5$ to 1, $10^3$ to 1, 10 to 1, etc.) may be predetermined as needed for a given particle concentration range and a known or calculated coincidence-error loss for a given measurement instrument (e.g., a CPC).

Also, as indicated above, the system can be configured to provide measurements based on volumetric or mass-based flow and calculations to allow these determinations and may also be included in, for example, firmware or software. The disclosed passive aerosol diluter mechanism also allows the "health" of the dilutor to be monitored, such that changes in dilution ratio, various pressures or temperatures, or flows may indicate that the filters or various ones of the flow-restricting devices are becoming or are plugged may be configured to generate an error to notify the end user as to various maintenance issues are needed. Further, the disclosed passive aerosol diluter mechanism can be configured to employ a modular sensor system and unique signal processing, including running averages, to perform passive dilution of an aerosol stream, thereby resulting in a very compact package. Therefore, the disclosed passive aerosol diluter mechanism solves the problem of having a robust and accurate dilution device to measure high concentrations of particles in the aerosol stream, such as those emitted from internal combustion and diesel engines. Moreover, the passive aerosol diluter mechanism may be configured as a drop-in replacement for non-automated types of diluters.

Exemplary Machine Architecture and Machine-Readable Storage Medium

Figure 5:
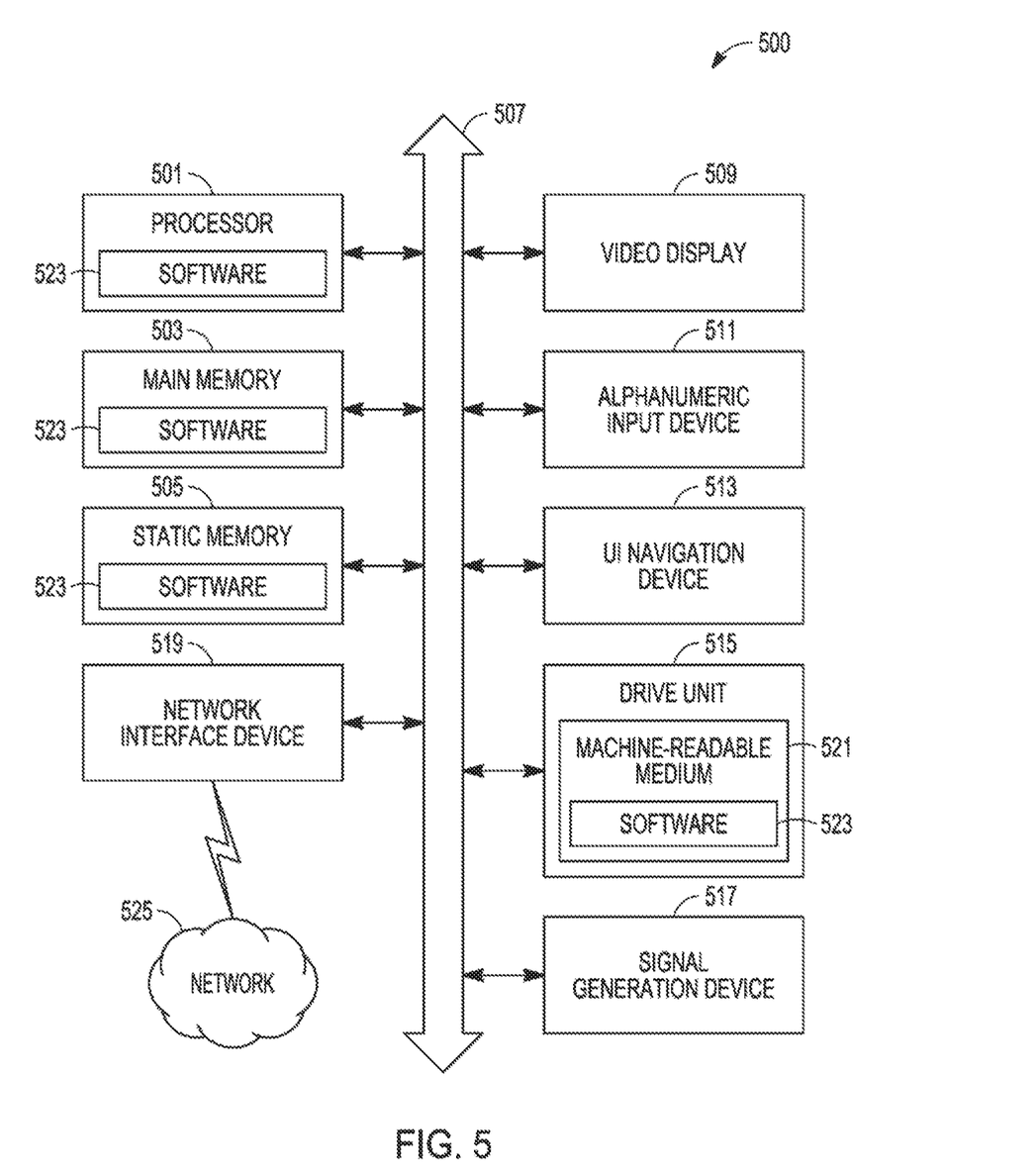
FIG. 5 is a simplified block diagram of a machine in an exemplary form of a computing system within which a set of instructions, for causing the machine to perform any one or more of the methodologies discussed herein, may be executed.

With reference now to FIG. 5, an exemplary embodiment extends to a machine in an example of a computer system 500 within which instructions, for causing the machine to perform any one or more of the methodologies discussed herein, may be executed. In alternative exemplary embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone a web appliance, a network router, a switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computer system 500 includes a processor 501 (e.g., a central processing unit (CPU), a graphics processing unit (GPU) or both), a main memory 503 and a static memory 505, which communicate with each other via a bus 507. The computer system 500 may further include a video display unit 509 (e.g., a liquid crystal display (LCD) or a cathode ray tube (CRT)). The computer system 800 also includes an alphanumeric input device 511 (e.g., a keyboard), a user interface (UI) navigation device 513 (e.g., a mouse), a disk drive unit 515, a signal generation device 517 (e.g., a speaker), and a network interface device 519.

Machine-Readable Medium

The disk drive unit 515 includes a non-transitory machine-readable medium 521 on which is stored one or more sets of instructions and data structures (e.g., software 823) embodying or used by any one or more of the methodologies or functions described herein. The software 523 may also reside, completely or at least partially, within the main memory 503 or within the processor 501 during execution thereof by the computer system 500; the main memory 803 and the processor 801 also constituting machine-readable media.

While the non-transitory machine-readable medium 521 is shown in an exemplary embodiment to be a single medium, the term "machine-readable medium" may include a single medium or multiple media (e.g., a centralized or distributed database, or associated caches and servers) that store the one or more instructions. The term "non-transitory machine-readable medium" shall also be taken to include any tangible medium that is capable of storing, encoding, or carrying instructions for execution by the machine and that cause the machine to perform any one or more of the methodologies of the present invention, or that is capable of storing, encoding, or carrying data structures used by or associated with such instructions. The term "non-transitory machine-readable medium" shall accordingly be taken to include, but not be limited to, solid-state memories, and optical and magnetic media. Specific examples of machine-readable media include non-volatile memory, including by way of exemplary semiconductor memory devices (e.g., EPROM, EEPROM, and flash memory devices); magnetic disks such as internal hard disks and removable disks; magneto-optical disks; and CD-ROM and DVD-ROM disks.

Transmission Medium

The software 523 may further be transmitted or received over a communications network 525 using a transmission medium via the network interface device 519 utilizing any one of a number of well-known transfer protocols (e.g., HTTP). Examples of communication networks include a local area network (LAN), a wide area network (WAN), the Internet, mobile telephone networks, Plain Old Telephone (POTS) networks, and wireless data networks (e.g., WiFi and WiMax networks). The term "transmission medium" shall be taken to include any intangible medium that is capable of storing, encoding, or carrying instructions for execution by the machine, and includes digital or analog communications signals or other intangible medium to facilitate communication of such software.

Although an overview of the inventive subject matter has been described with reference to specific exemplary embodiments, various modifications and changes may be made to these embodiments without departing from the broader spirit of the present invention. Such embodiments of the inventive subject matter may be referred to herein, individually or collectively, by the term "invention" merely for convenience and without intending to voluntarily limit the scope of this application to any single invention or inventive concept if more than one is, in fact, disclosed.

The description above includes illustrative examples, devices, and apparatuses that embody the disclosed subject matter. In the description, for purposes of explanation, numerous specific details were set forth in order to provide an understanding of various embodiments of the inventive subject matter. It will be evident, however, to those of ordinary skill in the art that various embodiments of the inventive subject matter may be practiced without these specific details. Further, well-known structures, materials, and techniques have not been shown in detail, so as not to obscure the various illustrated embodiments.

As used herein, the term "or" may be construed in an inclusive or exclusive sense. Additionally, although various exemplary embodiments discussed herein focus on particular ways to dilute a sampled particle stream, other embodiments will be understood by a person of ordinary skill in the art upon reading and understanding the disclosure provided. Further, upon reading and understanding the disclosure provided herein, the person of ordinary skill in the art will readily understand that various combinations of the techniques and examples provided herein may all be applied serially or in various combinations.

Although various embodiments are discussed separately, these separate embodiments are not intended to be considered as independent techniques or designs. As indicated above, each of the various portions may be inter-related and each may be used separately or in combination with other diluter techniques discussed herein.

Moreover, although specific values, ranges of values, measurement values, and techniques are given for various parameters discussed herein, these values and techniques are provided merely to aid the person of ordinary skill in the art in understanding certain characteristics of the designs and techniques disclosed herein. Those of ordinary skill in the art will realize, upon reading and understanding the disclosure provided, that these values and techniques are presented as examples only and numerous other values, ranges of values, and techniques may be employed while still benefiting from the novel designs discussed that may be employed to dilute a given particle-laden sample stream. Therefore, the various illustrations of the apparatus are intended to provide a general understanding of the structure and design of various embodiments and are not intended to provide a complete description of all the elements and features of the apparatus that might make use of the structures, features, and designs described herein.

Many modifications and variations can be made, as will be apparent to the person of ordinary skill in the art upon reading and understanding the disclosure provided herein. Functionally equivalent methods and devices within the scope of the disclosure, in addition to those enumerated herein, will be apparent to a person of ordinary skill in the art from the foregoing descriptions. Portions and features of some embodiments may be included in, or substituted for, those of others. Many other embodiments will be apparent to those of ordinary skill in the art upon reading and understanding the description provided. Such modifications and variations are intended to fall within a scope of the appended claims. Therefore the present disclosure is to be limited only by the terms of the appended claims, along with the full scope of equivalents to which such claims are entitled. It is also to be understood that the terminology used herein is for the purpose of describing particular embodiments only and is not intended to be limiting.

The Abstract of the Disclosure is provided to allow the reader to quickly ascertain the nature of the technical disclosure. The abstract is submitted with the understanding that it will not be used to interpret or limit the claims. In addition, in the foregoing Detailed Description, it may be seen that various features may be grouped together in a single embodiment for the purpose of streamlining the disclosure. This method of disclosure is not to be interpreted as limiting the claims. Thus, the following claims are hereby incorporated into the Detailed Description, with each claim standing on its own as a separate embodiment.

What is claimed is:

1. A passive aerosol diluter system to dilute a sampled aerosol stream, the system comprising:
    an aerosol sample inlet to receive a sample of an aerosol stream;
    a primary diluter device having a first inlet coupled pneumatically downstream from the aerosol sample inlet and a second inlet to accept a filtered portion of a portion of the sampled aerosol stream, the primary diluter device to combine the filtered portion with an additional sampled aerosol stream received from the aerosol sample inlet, the first inlet and the second inlet comprising a portion of a recirculating dilution portion of the passive aerosol diluter system;

a flow diverter device coupled pneumatically downstream of the primary diluter device to split at least the sampled aerosol stream into a first portion of the sampled aerosol stream and a remaining portion of the sampled aerosol stream; and a filter coupled pneumatically downstream of and in fluid communication with the flow diverter device to receive the remaining portion of the sampled aerosol stream from the aerosol sample inlet to provide a filtered aerosol stream to the second inlet of the primary diluter device.

2. The passive aerosol diluter system of claim 1, further comprising:

a secondary dilution-flow orifice and mixing portion coupled pneumatically downstream from the flow diverter device to receive the first portion of the sampled aerosol stream from the aerosol sample inlet, the secondary dilution-flow orifice and mixing portion including a tee to receive and split flow from the first portion of the sampled aerosol stream into a first fraction and a remaining second fraction;

a mixing portion flow-monitoring device coupled pneumatically downstream of the tee to receive the first fraction of the sampled aerosol stream, the flow-monitoring device being configured to allow for a passage of particles contained in the sampled aerosol stream; and a filter pneumatically coupled downstream of the tee and in parallel with the flow-monitoring device, the filter to remove at least a portion of aerosol particles from the second remaining fraction of the sampled aerosol stream, thereby producing a filtered stream, an outlet of the filter coupled to an outlet of the mixing portion flow-monitoring device to recombine the filtered stream with the sampled aerosol stream, creating a more diluted aerosol stream than the diluted aerosol stream received from the first fraction of the sampled aerosol stream.

3. The passive aerosol diluter system of claim 2, wherein an outlet of the secondary dilution-flow orifice and mixing portion containing the more diluted aerosol stream is configured to be provided to a particle monitoring device.

4. The passive aerosol diluter system of claim 3, wherein the particle monitoring device is a condensation particle counter.

5. The passive aerosol diluter system of claim 1, further comprising a primary-diluter flow-monitoring device pneumatically coupled between the flow diverter device and the second inlet of the primary diluter device, the primary-diluter flow-monitoring device being configured to control a volumetric airflow through the primary-diluter flow-monitoring device based on a predetermined dilution ratio within the passive aerosol diluter system.

6. The passive aerosol diluter system of claim 5, further comprising a pressure sensor and a temperature sensor to monitor a pressure and a temperature of the aerosol stream upstream of the flow-monitoring device.

7. The passive aerosol diluter system of claim 5, wherein the pressure sensor is an absolute pressure sensor configured to monitor a pressure of the aerosol stream entering the primary-diluter flow-monitoring device.

8. The passive aerosol diluter system of claim 5, further comprising a differential pressure sensor to monitor a pressure difference across the primary-diluter flow-monitoring device.

9. The passive aerosol diluter system of claim 5, wherein the primary-diluter flow-monitoring device is a critical orifice.

10. The passive aerosol diluter system of claim 9, further comprising sizing an orifice for a predetermined nominal volumetric flowrate through the critical orifice.

11. The passive aerosol diluter system of claim 1, further comprising a mixing chamber within the primary diluter device configured to combine the additional sampled aerosol stream received from the aerosol sample inlet and the filtered aerosol stream.

12. The passive aerosol diluter system of claim 2, further comprising placing a differential pressure sensor across the flow-monitoring device to measure a differential pressure of the flow-monitoring device.

13. The passive aerosol diluter system of claim 1, further comprising a pressure sensor and a temperature sensor to monitor a pressure and a temperature of the aerosol stream upstream of the filter.

14. The passive aerosol diluter system of claim 1, further comprising a catalytic stripper coupled pneumatically downstream of the flow diverter device to receive the first portion of the sampled aerosol stream, the catalytic stripper to remove volatile particles from the aerosol stream.

15. A method of diluting a sampled aerosol stream, the method comprising:

receiving a sample of an aerosol stream at a primary diluter, the primary diluter device having a first inlet coupled pneumatically downstream from an aerosol sample inlet and a second inlet to accept a filtered portion of a portion of the sampled aerosol stream;

combining, in the primary diluter device, the filtered portion with an additional sampled aerosol stream received from the aerosol sample inlet;

splitting, within a flow diverter device, at least the sampled aerosol stream into a first portion of the sampled aerosol stream and a remaining portion of the sampled aerosol stream; and filtering the remaining portion of the sampled aerosol stream and providing a filtered aerosol stream to the second inlet of the primary diluter device.

16. The method of claim 15, further comprising:

receiving at a secondary dilution-flow orifice and mixing portion the first portion of the sampled aerosol stream from the aerosol sample inlet, the secondary dilution-flow orifice and mixing portion including a tee receiving and splitting flow from the first portion of the sampled aerosol stream into a first fraction and a remaining second fraction;

receiving the first fraction of the sampled aerosol stream in a mixing portion flow-monitoring device, the flow-monitoring device allowing for a passage of particles contained in the sampled aerosol stream; and filtering, in a filter pneumatically coupled downstream of the tee and in parallel with the mixing portion flow-monitoring device, and removing at least a portion of aerosol particles from the second remaining fraction of the sampled aerosol stream, thereby producing a filtered stream; and recombining the filtered stream with the sampled aerosol stream, creating a more diluted aerosol stream than the diluted aerosol stream received from the first fraction of the sampled aerosol stream.

17. The method of claim 16, further comprising providing the first portion of the aerosol stream from an outlet of the flow-monitoring device with the filtered airstream to a particle monitoring device.

18. The method of claim 15, further comprising:
calculating an actual flowrate of the filtered stream;
calculating an actual flowrate of the first portion of the aerosol stream; and
calculating a dilution ratio based on a ratio of the actual flowrate of the first portion of the aerosol stream and the actual flowrate of the filtered airstream.

19. The method of claim 18, wherein the calculations of actual flowrates are determined by thermodynamic properties of one or more gases comprising the aerosol stream based on the monitored temperature and the monitored pressure of the flow-monitoring device.

20. The method of claim 18, further comprising calculating running averages of the actual flowrates.

21. The method of claim 18, further comprising applying a smoothing function to the actual flowrates.

22. The method of claim 18, further comprising predetermining a time interval over which to update actual determinations of the actual flowrate of the first portion of the aerosol stream from the outlet of the flow-monitoring device.

23. A tangible computer-readable storage medium having no transitory components and storing instructions that, when executed by one or more processors, cause the one or more processors to perform operations comprising:
receiving a sample of an aerosol stream at a primary diluter, the primary diluter device having a first inlet coupled pneumatically downstream from an aerosol sample inlet and a second inlet to accept a filtered portion of a portion of the sampled aerosol stream;
combining, in the primary diluter device, the filtered portion with an additional sampled aerosol stream received from the aerosol sample inlet;
splitting, within a flow diverter device, at least the sampled aerosol stream into a first portion of the sampled aerosol stream and a remaining portion of the sampled aerosol stream; and
filtering the remaining portion of the sampled aerosol stream and providing a filtered aerosol stream to the second inlet of the primary diluter device.

24. The tangible computer-readable storage medium of claim 23, further comprising:
receiving at a secondary dilution-flow orifice and mixing portion the first portion of the sampled aerosol stream from the aerosol sample inlet, the secondary dilution-flow orifice and mixing portion including a tee receiving and splitting flow from the first portion of the sampled aerosol stream into a first fraction and a remaining second fraction;
receiving the first fraction of the sampled aerosol stream in a mixing portion flow-monitoring device, the flow-monitoring device allowing for a passage of particles contained in the sampled aerosol stream; and
filtering, in a filter pneumatically coupled downstream of the tee and in parallel with the mixing portion flow-monitoring device, and removing at least a portion of aerosol particles from the second remaining fraction of the sampled aerosol stream, thereby producing a filtered stream; and
recombining the filtered stream with the sampled aerosol stream, creating a more diluted aerosol stream than the diluted aerosol stream received from the first fraction of the sampled aerosol stream.

25. A passive aerosol diluter system, comprising:
an aerosol sample inlet to receive a sample of an aerosol stream;
a primary diluter device having a first inlet coupled pneumatically downstream from the aerosol sample inlet and a second inlet to accept a filtered portion of a portion of the sampled aerosol stream, the primary diluter device to combine the filtered portion with an additional sampled aerosol stream received from the aerosol sample inlet, the first inlet and the second inlet comprising a portion of a recirculating dilution portion of the passive aerosol diluter system;
a flow diverter device coupled pneumatically downstream of the primary diluter device to split at least the sampled aerosol stream into a first portion of the sampled aerosol stream and a remaining portion of the sampled aerosol stream;
a filter coupled pneumatically downstream of and in fluid communication with the flow diverter device to receive the remaining portion of the sampled aerosol stream from the aerosol sample inlet to provide a filtered aerosol stream to the second inlet of the primary diluter device
a secondary dilution-flow orifice and mixing portion coupled pneumatically downstream from the flow diverter device to receive the first portion of the sampled aerosol stream from the aerosol sample inlet, the secondary dilution-flow orifice and mixing portion including a tee to receive and split flow from the first portion of the sampled aerosol stream into a first fraction and a remaining second fraction;
a mixing portion flow-monitoring device coupled pneumatically downstream of the tee to receive the first fraction of the sampled aerosol stream, the flow-monitoring device being configured to allow for a passage of particles contained in the sampled aerosol stream; and
a filter pneumatically coupled downstream of the tee and in parallel with the flow-monitoring device, the filter to remove at least a portion of aerosol particles from the second remaining fraction of the sampled aerosol stream, thereby producing a filtered stream, an outlet of the filter coupled to an outlet of the mixing portion flow-monitoring device to recombine the filtered stream with the sampled aerosol stream, creating a more diluted aerosol stream than the diluted aerosol stream received from the first fraction of the sampled aerosol stream.

* * * * *

UNITED STATES PATENT AND TRADEMARK OFFICE
CERTIFICATE OF CORRECTION

Page 1 of 2

PATENT NO. : 11,486,803 B2
APPLICATION NO. : 16/912531
DATED : November 1, 2022
INVENTOR(S) : Johnson et al.

It is certified that error appears in the above-identified patent and that said Letters Patent is hereby corrected as shown below:

In the Specification

In Column 1, Line 41, delete "(CARE)." and insert --(CARB).-- therefor

In Column 1, Line 51, delete "dilators" and insert --dilutors-- therefor

In Column 2, Line 29, after "herein", insert --,--

In Column 2, Line 43, after "measured", insert --,--

In Column 5, Line 39, after "(dilution)", insert --.--

In Column 5, Line 44, after "air", insert --,--

In Column 5, Line 65, delete "143" and insert --119-- therefor

In Column 5, Line 67, after "embodiment", insert --,--

In Column 6, Line 15, after "valve", insert --,--

In Column 6, Line 40, after "spectrometer", insert --,--

In Column 6, Line 56, after "determine", insert --,--

In Column 6, Line 57, after "time", insert --,--

In Column 9, Line 54, after "algorithms", insert --,--

In Column 13, Line 6, after "Instead", insert --,--

Signed and Sealed this
Twenty-sixth Day of September, 2023

Katherine Kelly Vidal
*Director of the United States Patent and Trademark Office*

CERTIFICATE OF CORRECTION (continued)
U.S. Pat. No. 11,486,803 B2

In Column 13, Line 23, after "300", insert --,--

In Column 13, Line 27, after "300", insert --,--

In Column 13, Line 62, after "minute-by-minute", insert --,--

In Column 14, Line 37, after "telephone", insert --,--

In Column 14, Line 52, delete "800" and insert --500-- therefor

In Column 16, Line 39, after "Therefore", insert --,--

In the Claims

In Column 18, Line 53, in Claim 16, after "stream;", delete "and"

In Column 19, Line 53, in Claim 24, after "stream;", delete "and"

In Column 20, Line 31, in Claim 25, after "device", insert --;--